United States Patent Office 3,356,102
Patented Dec. 5, 1967

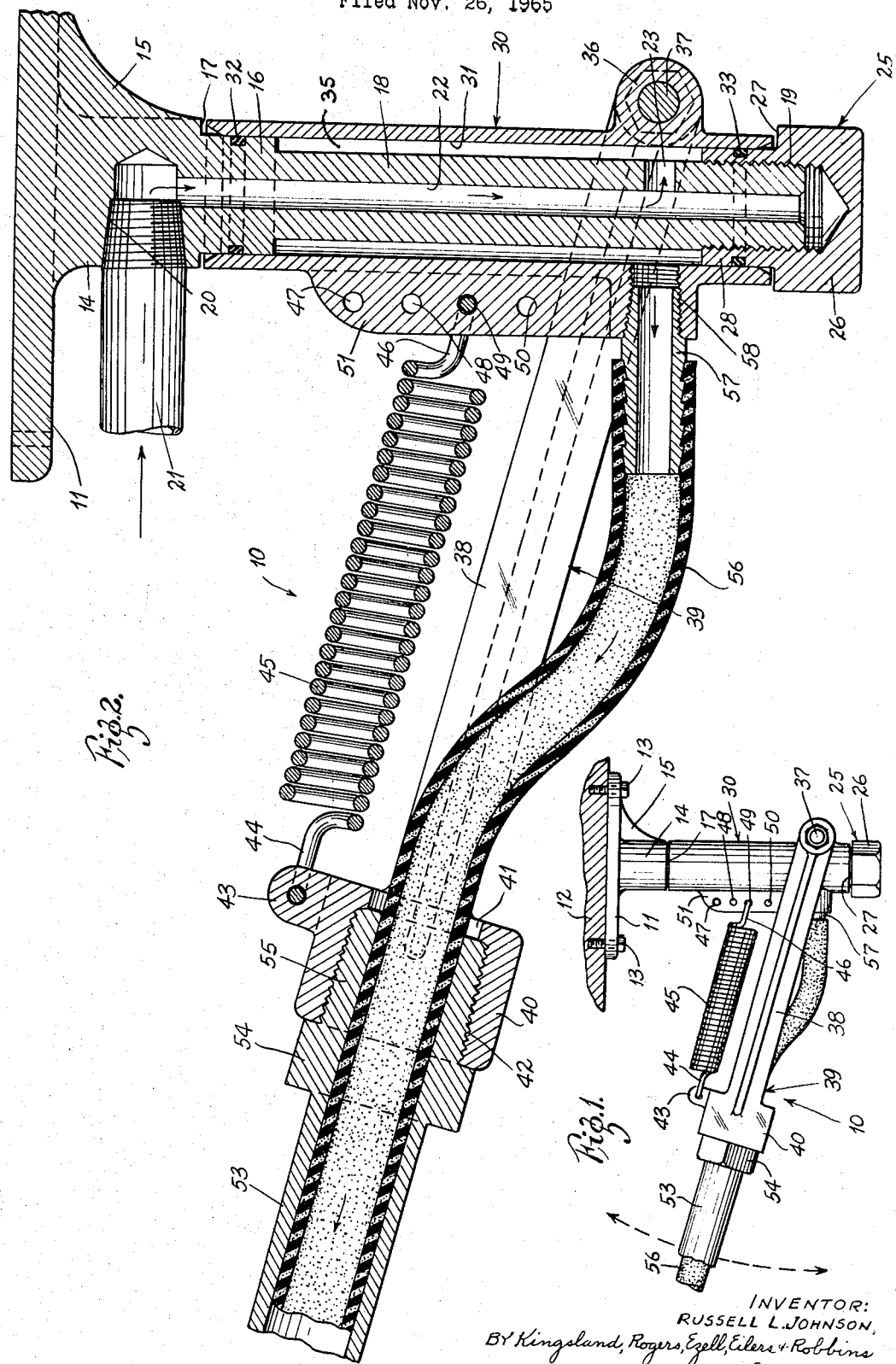

3,356,102
OVERHEAD BOOM
Russell L. Johnson, Dallas, Tex., assignor to The John E. Mitchell Company, Dallas, Tex., a corporation of Missouri
Filed Nov. 26, 1965, Ser. No. 509,848
3 Claims. (Cl. 137—357)

This invention relates to an overhead boom and particularly to an overhead boom that has mechanism to support a flexible hose and to swing through a 360° arc. The general object of the invention is to provide such an overhead boom that has an effective but inexpensive resilient mounting to minimize the leverage applied against the boom mount when jerking forces are exerted to rotate or pull on the boom, with inexpensive and effectively sealed liquid passages leading from the stationary spindle of the boom support to the outer surrounding sleeve and thence to the hose.

In general, this overhead boom comprises a mounting plate adapted to be mounted to an overhead ceiling structure. The mounting plate supports a downwardly extending hub at its center and there is in turn a downwardly extending spindle projecting below the hub. Between the spindle and hub there is a bearing cylinder having a diameter larger than that of the spindle and smaller than that of the hub. A collar is threaded onto the bottom of the spindle and provides a lower bearing cylinder. A sleeve is mounted to rotate on the bearing cylinders with O-ring seals provided between the sleeve and the bearing cylinders. The sleeve has a horizontal pivot to support a fork that has means defining a tubular outer end. There is a hose connection through the wall of the cylinder to which a hose is attached and from which the hose is fed through the tubular outer end of the fork. Liquid is introduced into the center of the spindle and is directed outwardly to the space between the spindle and the sleeve between the bearing cylinders and thence to the hose. The fork is held in a generally horizontal position by a tension coil spring so that forces applied to the fork when the hose is pulled are largely absorbed by the spring.

In the drawing:
FIGURE 1 is a side elevation view of the overhead boom; and
FIGURE 2 is an enlarged view in longitudinal vertical section through the boom and its mounting apparatus.

Referring now to the drawing, the boom 10 comprises a mounting plate 11 adapted to be mounted to an overhead ceiling structure 12 by a plurality of bolts 13. There is a downwardly projecting hub 14 at the center of the mounting plate 11, and there may be suitable stiffening flanges 15.

At the center and projecting below the hub 14, there is an upper bearing cylinder 16 of smaller diameter than the hub 14. There is an annular stop shoulder 17 surrounding the upper bearing cylinder 16 at its upper end.

A spindle 18 of smaller diameter than the upper bearing cylinder 16 projects below the bearing cylinder 16. The spindle 18 is coaxial with the upper bearing cylinder 16. There are external threads 19 at the lower end of the spindle 18.

There is a tapped opening 20 leading to the center of the hub 14 for receiving a pipe or liquid hose 21. A passage 22 extends through the spindle 18 and the upper bearing cylinder 16 and communicates with the opening 20. A hole 23 through the wall of the spindle 18 opens from the passage 22.

A collar 25 is threaded onto the end 19 of the spindle 18. The collar has a relatively large head 26 with an annular horizontal bearing shoulder 27 surrounding an upwardly extending lower bearing cylinder 28. When the collar 25 is threaded onto the spindle 18, it provides an effective liquid seal at the bottom of the passage 22.

A sleeve 30 is mounted on the upper and lower bearing cylinders 16 and 28 with its inner wall 31 bearing against the surfaces of the bearing cylinder. There are O-rings 32 and 33 to provide liquid seals between the sleeve 30 and the bearing cylinders 16 and 28. The space 35 between the inner wall 31 of the sleeve 30 and the outer wall of the spindle 18 provides an annular fluid passage surrounding the spindle which is fed liquid through the hole 23 from the passage 22.

There is a boss 36 on a side of the sleeve 30 through which a horizontal shaft bolt 37 extends. The shaft bolt 37 mounts the arms 38 of a fork 39 onto the boss 36. There is a sleeve 40 at the outer end of the arms 38 having an opening 41 through it with internal threads 42. There is also an ear 43 on the upper end of the sleeve 42 through which an end 44 of a tension coil spring 45 is hooked. The other end 46 of the coil spring 45 is hooked through a selected one of a plurality of vertically spaced holes 47, 48, 49, and 50 in a vertical flange 51 on the sleeve 30.

A pipe 53 having a nut 54 adjacent a tapped end 55 is threaded into the sleeve 40. The pipe 53 may be any desired length depending upon the total radius desired for the overhead boom 10. A flexible hole 56 extends between the arms 38 and through the pipe 53. There is a hose connector 57 threaded into an opening 58 through the wall of the sleeve 30. The end of the hose 56 is pressed onto the hose connector 57.

Water or other liquid entering through the pipe 21 passes through the passage 22 and the hole 23 to the surrounding annular passage 35 and thence through the opening 58 to the hose 56. Suitable nozzles at the free end of the hose (not shown) direct the spray from the hose. The boom 10 provides free full 360° of rotation of the hose 56 because the sleeve 30 can rotate freely about the bearing cylinders 16 and 28. The resistance to vertical swinging of the arms 38 may be adjusted depending upon selection of one of the holes 47–50 for the end of the spring 45. The spring 45 also absorbs the shock forces applied when the boom is jerked during initial movements.

Various changes and modifications may be made within the purview of this invention as will be readily apparent to those skilled in the art. Such changes and modifications are within the scope and teaching of this invention as defined by the claims appended hereto.

What is claimed is:
1. An overhead boom comprising a spindle, means connected to the spindle to mount the spindle in vertical suspension from an overhead ceiling, means mounting a sleeve for rotation about the spindle, means sealing the upper and lower ends of the sleeve against the passage of liquid between the ends of the sleeve and the spindle, means defining a central liquid passage through the center of the spindle, means defining a liquid passage around the outside of the spindle, but confined within the sleeve, means connecting the central passage with the surrounding passage, a boom arm, means supporting the boom arm on the sleeve for unrestricted vertical swinging movement, a tension spring between the boom arm and the sleeve for holding the boom arm in a generally horizontal position and for yielding to permit pivotal movement of the boom arm downwardly from the said horizontal position, means supporting a flexible hose at the outer end of the boom arm, and means connecting the hose to the sleeve in communication with the surrounding passage.

2. The combination of claim 1 wherein the sealing means comprise O-rings.

3. The combination of claim 1 wherein the sleeve supports a plurality of vertically spaced mounts to which an end of the spring is mounted to vary the resistance of the spring to movements of the boom arm.

References Cited

UNITED STATES PATENTS

| | | | |
|---|---|---|---|
| 980,353 | 1/1911 | Smith | 285—64 XR |
| 1,167,479 | 1/1916 | Collison | 137—357 |
| 3,265,087 | 8/1966 | Livingston | 239—209 XR |

FOREIGN PATENTS

Ad. 35,250 7/1929 France.

HENRY T. KLINKSIEK, *Primary Examiner.*